United States Patent [19]

Sano et al.

[11] Patent Number: 5,008,332
[45] Date of Patent: Apr. 16, 1991

[54] THERMOPLASTIC RESIN COMPOSITION

[75] Inventors: Hironari Sano; Kenyu Ohno, both of Mie, Japan

[73] Assignee: Mitsubishi Petrochemical Co., Ltd., Tokyo, Japan

[21] Appl. No.: 122,135

[22] Filed: Nov. 17, 1987

[30] Foreign Application Priority Data

Nov. 19, 1986 [JP] Japan .................................. 61-275699

[51] Int. Cl.$^5$ ...................... C08L 53/00; C08L 67/02; C08L 71/12; C08L 77/02
[52] U.S. Cl. ........................................ 525/92; 525/152; 525/177; 525/179; 525/184; 525/185; 525/232; 525/240; 525/241
[58] Field of Search .................. 525/92, 397, 905, 152, 525/177, 179, 184, 185, 232, 240, 241

[56] References Cited

U.S. PATENT DOCUMENTS

| | | | |
|---|---|---|---|
| 4,315,086 | 2/1982 | Ueno et al. | 525/397 |
| 4,681,915 | 7/1987 | Bates et al. | 525/397 |
| 4,772,664 | 9/1988 | Ueda et al. | 525/92 |

FOREIGN PATENT DOCUMENTS

| | | |
|---|---|---|
| 0080666 | 6/1983 | European Pat. Off. . |
| 0133487 | 2/1985 | European Pat. Off. . |
| 0135726 | 4/1985 | European Pat. Off. . |
| 0225170 | 6/1987 | European Pat. Off. . |
| 0231626 | 8/1987 | European Pat. Off. . |
| 0237948 | 9/1987 | European Pat. Off. . |
| 2375294 | 12/1977 | France . |
| 8700850 | 2/1987 | World Int. Prop. O. . |

Primary Examiner—Jacob Ziegler
Attorney, Agent, or Firm—Oblon, Spivak, McClelland, Maier & Neustadt

[57] ABSTRACT

A resin composition comprising an amorphous polymer as component (1), a crystalline polymer as component (2) and a rubber like polymer as component (3), wherein component (1) is dispersed in component (2) and component (3) is dispersed in component (2) in network form is disclosed. The resin composition has excellent mechanical properties such as impact strength, flexural modulus, etc.

11 Claims, 3 Drawing Sheets

THERMOPLASTIC RESIN COMPOSITION

FIELD OF THE INVENTION

The present invention relates to a thermoplastic resin composition having excellent mechanical strength balance, resistance to chemicals and thermal property.

BACKGROUND OF THE INVENTION

Various compositions comprising a plurality of thermoplastic resins have hitherto been proposed. Many recent inventions directed to compositions mainly for industrial parts are to realize the quality balance which has not been obtained by a single resin, by combining the excellent resistance to chemicals and molding processability that a crystalline polymer has and the excellent thermal characteristics and dimensional stability that an amorphous polymer has. For example, Japanese Patent Publication No. 7069/67 discloses a combination of a polypropylene (hereinafter referred to as "PP", for brevity) and a polyphenylene ether (hereinafter referred to as "PPE", for brevity), Japanese Patent Publication No. 41663/84 discloses a combination of a polyamide (hereinafter referred to as "PA", for brevity) and PPE, and Japanese Patent Publication No. 21664/76 discloses a combination of a polyester (hereinafter referred to as "PES", for brevity) and PPE.

However, those crystalline polymer and amorphous polymer are inherently immiscible with each other and are reluctant to be mixed with each other, whereby the mechanical strength of the composition formed by mixing the polymers does not reach a practically required performance.

Accordingly, various attempts have been proposed to improve the qualities by adding compatibilizers or rubber components for facilitating mixing of polymer components which are reluctant to be mixed with each other. For example, for the combination of PPE and PP, the addition of SBS (styrene-butadiene block copolymer) or its hydrogenated rubber is disclosed in Japanese Patent Application (OPI) Nos. 103557/83 and 76547/85 (the term "OPI" as used herein means an "unexamined published application"), for the combination of PES and PPE, the addition of a specific compatibilizer for phenoxy resin is disclosed in Japanese Patent Application (OPI) No. 147465/85, and for the combination of PA and PPE, the addition of a rubber such as SBS, etc., is disclosed in Japanese Patent Application Nos. 220737/85 and 265358/85.

However, those attempts have not yet satisfied the wider and higher performance required in recent industrial fields.

SUMMARY OF THE INVENTION

As the result of detailed investigations on the relationship between the higher order structure of resin compositions and various properties thereof using electron microscope in order to obtain a composition containing an amorphous polymer and a crystalline polymer and having excellent resistance to chemicals, mechanical strength, and thermal properties, the inventors have succeeded to attain the present invention.

More particularly, it has been clarified that in a composition comprising an amorphous polymer, a crystalline polymer and a rubber-like polymer, the mechanical strength (in particular, the impact strength) and the thermal properties (in particular, the temperature dependence of flexural modulus) of the composition is greatly influenced by the domain wherein the rubber-like polymer exists and also the existing state of the rubber-like polymer in the composition. For example, if the rubber-like polymer exists in the crystalline polymer which is a matrix of the composition, the flexural modulus of the composition is deteriorated and if the rubber-like polymer exists at the interface between the crystalline polymer and the amorphous polymer which is a dispersed phase, the effect of employing the high modulus amorphous polymer is not obtained not only at high temperature but also at room temperature although the impact strength may be improved. On the other hand, in the composition wherein the rubber-like polymer is dispersed in the dispersed phase, the flexural modulus is high and this tendency is particularly remarkable at high temperature.

Furthermore, it has been found that the state of the rubber-like polymer in the amorphous polymer phase gives remarkable influences on the mechanical strength, in particular, the impact strength, of the composition, and further a very interesting and important fact that the composition wherein the rubber-like polymer is dispersed in a network form has very high impact strength as compared to the composition wherein the rubber-like polymer exists in particle form has now been found.

Also, as the result of various investigations on the means for forming the desired higher order structure of the rubber-like polymer in a thermoplastic resin composition, that is, the means for forming a network structure of the rubber-like polymer in the amorphous polymer (e.g., a means for controlling the melt viscosity ratio of the amorphous polymer and the rubber-like polymer), the present invention has been established.

Thus, the present invention is based on the discovery that the composition comprising an amorphous polymer, a crystalline polymer and a rubber-like polymer, wherein the rubber-like polymer has a network structure in the amorphous polymer, has excellent mechanical strength, thermal properties and resistance to chemicals.

Accordingly, an object of the present invention is to provide a thermoplastic resin composition having excellent mechanical strength, thermal properties and resistance to chemicals.

The thermoplastic resin composition according to the present invention comprises following components (1), (2) and (3), wherein component (2) forms a continuous phase, component (1) forms a continuous phase intermingled with component (2) or forms a dispersed phase in component (2), and component (3) is dispersed in component (1), at least a part of component (3) having a continuous structure;

Component (1)

5 to 65% by weight of an amorphous polymer having a glass transition temperature of at least 90° C.

Component (2)

20 to 92% by weight of a crystaline polymer showing, at least partially, crystalline property and having a melting point of at least 100° C.

Component (3)

3 to 50% by weight of a rubber-like polymer having a storage shear modulus at room temperature of $5 \times 10^8$ dyne/cm$^2$ or less all weight% being based on the weight of the thermoplastic resin composition.

BRIEF DESCRIPTION OF THE DRAWINGS

FIG. 1 is a graph showing the temperature dependence of the storage shear modulus of the composition according to the present invention obtained in Example 2, FIG. 2 is a graph showing the temperature dependence of the storage shear modulus of the composition according to the present invention obtained in Example 8, and FIGS. 3 to 6 are microphotographs showing the dispersion states of the resin compositions obtained in the examples of the present invention and comparison examples.

DETAILED DESCRIPTION OF THE INVENTION

The amorphous polymer which can be used in the present invention is not particularly limited and any amorphous polymers having a glass transition temperature of at least 90° C. can be used. If the glass transition temperature is lower than 90° C., the stiffness of the composition at elevated temperatures is insufficient.

The amorphous polymer used in the present invention is a polymer such that an article thereof molded under a general molding condition shows a crystallinity by X ray diffraction of less than 25%, preferably less than 0%, and more preferably less than 15%, and the polymer does not show a clear melting point.

Specific examples of the amorphous polymer are polyphenylene ether, polycarbonate, amorphous polyamide, polyimide, polystyrene, polythioether, ABS resin, AS resin, polysulfone, polyether sulfone, and copolymers and modified products of the above-described polymers as the main components. Of those polymers, polyphenylene ether, polycarbonate, amorphous polyamide, polystyrene and ABS resin are preferred from the standpoint of the balance of thermal properties, mechanical properties and molding processability. In particular, polyphenylene ether and polycarbonate are more preferred and polyphenylene ether is most preferred.

The polyphenylene ether is a polymer obtained by oxidative coupling polymerizing at least one phenol compound represented by the formula

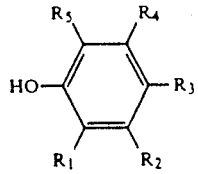

wherein $R_1$, $R_2$, $R_3$, $R_4$ and $R_5$ each represents a hydrogen, a halogenated hydrocarbon group, a hydrocarbon group or a substituted hydrocarbon group.

Examples of the preferred phenol compound are 2,6-dimethylphenol, 2,6-diphenylphenol, 2,3,6-trimethylphenol, 2,6-diisopropylphenol, etc.

Examples of the suitable polymer are poly-2,6-dimethylphenol, a copolymer of a large proportion of 2,6-dimethylphenol and a small proportion of 2,3,6-trimethyl phenol or 2,6-diphenylphenol, etc. Also, the abovedescribed polymers a part of the structural components of which was modified by oxidation or catalyst seed during the polymerization reaction are preferred.

Furthermore, a modified polyphenylene ether formed by chemically combining polyphenylene ether with a styrenic monomer or polymer, or other vinylic monomer or polymer can be used in the present invention.

The polyphenylene ether suitably has an intrinsic viscosity (measured at 30° C. in chloroform) of from 0.32 to 0.55, and preferably from 0.40 to 0.50(dl/g).

A mixture of a large proportion of polyphenylene ether and a styrenic resin having good compatibility with the polyphenylene ether can also be used. Such compositions are widely practically used as commercially available product such as "Noryl", a trade name, made by General Electric Company Ltd.

The polycarbonate is a thermoplastic aromatic polycarbonate polymer, which may be branched, prepared by reacting an aromatic dihydroxy compound and phosgene or a diester of dicarboxylic acid, if necessary, together with a small amount of a polyhydroxy compound.

Typical examples of the aromatic polycarbonate resin are a bis(4-hydroxyphenyl)alkane series compound and, in particular, polycarbonate prepared using bisphenol A as the main raw material. Furthermore, a polycarbonate copolymer obtained by using two or more kinds of aromatic dihydroxy compounds and a branched polycarbonate obtained by using a small amount of poly(hydroxy)phenyl substituted compound together with the above-described dihydroxy compounds can be used. The aromatic polycarbonates may be used as a mixture of two or more kinds thereof.

The crystalline polymer which can be used in the present invention is not particularly limited, and any crystalline polymers having a melting point of at least 100° C. can be used. If the melting point is lower than 100° C., the stiffness of the composition at elevated temperatures is reduced.

The crystalline polymer in the present invention is a polymer showing the crystallinity by X ray diffraction of at least 15%, preferably at least 20%, and more preferably at least 25% in the using state of the moldings thereof and having a clear melting point to some extent.

Specific examples of the crystalline polymer used in the present invention are polyolefin, crystalline polyamide, polyalkylene terephthalate, polyvinylidene chloride, polyphenylene sulfide, polyether ether ketone, and the copolymers and modified products of the abovedescribed polymers. Of those polymers, polyolefin, crystalline polyamide and polyalkylene terephthalate are preferred, and polyolefin is more preferred.

In addition, those crystalline polymers and amorphous polymers each may be used as a mixture of two or more kinds thereof.

Examples of the polyolefin which can be used as a crystalline polymer in the present invention are low density polyethylene, high density polyethylene, linear low density polyethylene, polypropylene, an ethylene/-propylene copolymer, polybutene, and a copolymer of the greater part of an olefin and a vinyl monomer such as vinyl acetate, etc.

Of those polymers, polypropylene is preferred from the standpoint of molding processability, resistance to chemicals, cost, etc.

Examples of the polyamide which can be used in the present invention include a polymer and copolymer formed by polycondensation of a diamine and a dibasic acid, selfpolycondensation of an amino acid, or polymerization of a lactam. Specific examples of the polyamide are polyhexamethyleneadipamide(nylon-6,6), polycaprolactam(nylon-6), polyhexamethylenesebacamide(nylon-6,10), and the copolymers thereof.

The polyester which can be used in the present invention is a linear polyester or linear copolyester composed of a unit obtained by condensation-reaction of an aromatic dicarboxylic acid or a derivative thereof and a diol or a derivative thereof as the main structural component. Examples of the polyester are polyethylene terephthalate, polyethylene isophthalate, polytetramethylene terephthalate, etc.

The polyester which is suitably used in the present invention has an intrinsic viscosity (measured at 30° C. in a mixed solvent of phenol and tetrachloroethane of 1:1 by weight ratio) of at least 0.6, preferably at least 0.75, and particularly preferably at least 0.80.

The rubber-like polymer which can be used in the present invention is not particularly limited and any rubber-like polymers having storage sheer modulus at room temperature of $5 \times 10^8$ dyne/cm$^2$ or less can be used.

Examples of the rubber-like polymer are an aromatic vinyl compound-conjugated diene block copolymer, a random copolymer (e.g., a styrene-butadiene block copolymer, a styrene-isoprene block copolymer, a styrene-butadiene random copolymer, etc.), an olefinic rubber-like copolymer (e.g., an ethylene-propylene rubber, an ethylene-butene rubber, an ethylene-propylene-butene rubber, etc.), etc., and the copolymers and modified products of these copolymers.

In the rubber-like polymer, a suitable structure is decided according to the combination of the crystalline polymer and the amorphous polymer and in general, a structure having higher compatibility or affinity for the amorphous polymer than for the crystalline polymer is selected.

For example, in the combination of polyphenylene ether and polypropylene, a rubber-like polymer having a high compatibility for polyphenylene ether containing styrene unit (e.g., a styrene-butadiene block copolymer, a styrene-isoprene block copolymer, etc.) is more preferred than an olefinic rubber having a compatibility for polypropylene.

Furthermore, in the examples of the present invention, specific compatibilizers are used but there are no particular restrictions on the kind and amount thereof in the present invention.

Still further, the compositions of the present invention may further contain, if necessary, additives such as rubbers, pigments, organic and/or inorganic fillers, etc.

In the present invention, the dispersed particles of the rubber-like polymer in the amorphous polymer have a network structure, whereby an excellent mechanical strength is obtained. However, from the standpoint of thermal resistance and resistance to chemicals, the proportion of component (1), i.e., an amorphous polymer, is from 5 to 65% by weight, preferably from 10 to 55% by by weight, and more preferably from 20 to 38% by weight, the proportion of component (2), i.e., a crystalline polymer, is from 20 to 92% by weight, preferably from 40 to 85% by weight, and more preferably from more than 50 to 65% by weight, and the proportion of component (3), i.e., a rubber-like polymer, is from 3 to 50% by weight, preferably from 5 to 35% by weight, and more preferably from 7 to 20% by weight.

If the proportion of the crystalline polymer is less than 20% by weight, the resistance to chemicals of the composition is insufficient, while if the proportion thereof is higher than 92% by weight (the proportion of the amorphous polymer is less than the above-described range), the composition is inferior in stiffness at elevated temperatures. Further, if the proportion of the rubber-like polymer is less than 3% by weight, the mechanical strength of the composition is insufficient, while if the proportion thereof is higher than 50% by weight, the rigidity of the composition is undesirably reduced.

The most important matter in the resin composition of the present invention is in the point of controlling the higher order structure of the composition.

According to the compounding ratio of the crystalline polymer and amorphous polymer, the crystalline polymer forms the matrix and the amorphous polymer forms the domain. When the proportion of the amorphous polymer is large, the crystalline polymer forms the domain and the amorphous polymer forms the matrix. Further, when the proportion of the crystalline polymer is almost same as that of the amorphous polymer, both polymers form a continuous phase wherein both polymers are intermingled with each other The feature of the present invention is such that the crystalline polymer forms a continuous phase, the amorphous polymer forms a continuous phase intermingled with the crystalline polymer or forms a dispersed phase in the crystalline phase, and the rubber-like polymer is dispersed in the amorphous polymer, at least a part thereof forming a continuous stringy or network structure.

The dispersed state of the amorphous polymer and crystalline polymer can be observed by cutting the composition with an ultramicrotome while cooling the composition to the liquid nitrogen temperature to form a mirror surface, selectively decomposing and corroding the PP portion by an oxygen plasma etching, and photographing the resulting  image with a scanning electron microscope. In the photograph obtained by this procedure, the component retained as  portion is PPE phase, and the continuous phase or discontinuous phase of the PPE phase can be judged and evaluated.

The term "network structure" used herein means a structure that the rubber-like polymer forms two-dimensional or three-dimensional network structure in the amorphous structure. The continuous structure or the network structure of the particles can be confirmed by observing the cross section of the resin composition with an electron microscope.

The form of the rubber-like polymer can be shown by the deflection of the cross section profile from a true circle.

That is, the compactness C can be obtained by the following formula $$C = 4\pi S/L^2$$

wherein S is an area of the phase of the rubber-like polymer and L is the circumferential length thereof (when hole exists, the length includes the circumferential length of the hole). If the phase of the rubber-like polymer is circle, C is 1 and as the phase is apart from circle, C becomes less than 1. The rubber-like polymer of the present invention is defined to have a value of less than 1.

In the resin composition of the present invention, when a molded article of the resin composition is cut and the cross section is observed by an electron microscope, the number of the particles of the rubber-like polymer of $C \leq 0.6$ is from 30 to 90%, preferably from 40 to 90%, of the particles of the whole rubber-like polymers, and in particular, the number of the particles of the rubber-like polymer having $C \leq 0.5$ is from 40 to 90% of the particles of the whole rubber-like polymers.

If the percentage of the number of the particle in the range of $C \leq 0.6$ is less than 30%, the impact strength of the resin composition is insufficient and if the percentage is higher than 90%, the flexural modulus of the resin composition, in particular the flexural modulus thereof at high temperature, is reduced.

In addition, in the above-described observing method, it is practical to select the magnification of the electron microscope such that the number of the particles of the whole rubber-like polymers is from 100 to 200.

The means for attaining the specific network structure of the rubber-like polymer in the present invention can be determined by overall considering
 (1) the chemical structure of the rubber-like polymer;
 (2) the molecular weight of the rubber-like polymer;
 (3) the kind (chemical structure) of the amorphous polymer;
 (4) the molecular weight of the amorphous polymer;
 (5) the compounding method;
 (6) the compounding condition (melt-kneading condition);
 (7) various kinds of additives, etc.

However, the present invention is not limited to the above-described means.

For example, by melt-kneading polyphenylene ether having an intrinsic viscosity (measured at 25° C. in chloroform) of 0.50 dl/g as an amorphous polymer, nylon 6,6 as a crystalline polymer, a styrene-butadiene block copolymer containing a styrene unit having excellent compatibility with the polyphenylene ether as a rubber-like polymer, and maleic anhydride as a compatibilizer at 280° C., a resin composition having the structure of the present invention, wherein the styrene-butadiene block copolymer has a network structure in the polyphenylene ether, can be obtained. On the other hand, when polyphenylene ether having the intrinsic viscosity of 0.44 dl/g is used, the styrene-butadiene block copolymer shows a particle structure in the polyphenylene ether and only a resin composition having low mechanical strength level is obtained.

The above difference is based on the difference in viscosity at melt-kneading of the polyphenylene ether and the styrene-butadiene block copolymer.

For obtaining the resin composition of the present invention, a knead-compounding method which is generally used for thermoplastic polymers can be applied.

For example, the above-described powdery or granular components are uniformly mixed by a Henschel mixer, a ribbon blender, a V-type blender, etc., and then kneaded by a single or multiple screw extruder, a roll mixer, a Banbury mixer, etc. In this case, the kneading condition is properly selected such that some specific components form a network structure. Also, as the case may be, specific components are previously melt-kneaded and thereafter, remaining components may be additionally kneaded with the abovedescribed components.

The present invention is described in greater detail by reference to the following examples.

1. Observation of Higher Order Structure

The higher order structure in the examples and comparison examples described hereinbelow was observed as A part cut from each test piece used for evaluating the properties was stained by $OsO_4$ and $RuO_4$, an ultrathin section was formed from the stained sample, and the structure was then observed using a transmission type electron microscope, JEM-100CX, made by JEOL Ltd. The rubber-like polymer in the resin composition was selectively stained by the above-described staining procedure and as a result, the polymer was viewed as dark photographic image, whereby the existing state of the rubber-like polymer could be confirmed.

From the photograph used to observe the existing state of the rubber-like polymer, the area S and the circumferential length L of each polymer phase were determined, a compactness C was calculated from the formula of $4\pi S/L^2$ to provide a histogram of the number n of the rubber-like polymer particles to C, and the number of the rubber-like polymer particles having C of 0.6 or less was determined. In addition, each sample was obtained so that n became 100 or larger from one microphotograph.

2. Evaluation of Each Property (1) Flexural Modulus

The flexural modulus was measured using an Instron tester according to ISO R178-1974 Procedure 12 (JIS K 7203).

(2) Izod Impact Strength

The Izod impact strength was measured using an Izod impact test machine, made by Toyo Seiki Seisakusho according to the notched Izod impact strength test method of ISO R180-1969 (JIS K 7110).

(3) Falling Weight Impact Strength

Onto a specimen placed on a support (hole diameter 40 mm) was let fall a weight which was a load sensor (2 m ×7 kgf), the deformation and rupture behavior of the specimen at the impact load was measured, and the impact energy absorbed until the specimen was fractured in the impact pattern obtained was calculated. The value obtained is defined as the impact strength of the material.

(4) Resistance to Chemicals

The resistance to chemicals was measured according to a Belgen's ¼ ellipse method (SPE Journal 667 (1962)). Practically, when a specimen of 2 mm in thickness was fixed on a ¼ elliptical jig of 24 cm in long axis and 8 cm in short axis and immersed in commercially available gasoline for 5 minutes, the minimum distortion causing fracture was determined as a limiting strain.

In this case, the specimen causing no crack was defined as ● (very good), the specimen showing the limiting strain of 1.5% or more as ○ (good), the specimen of 1.0 to 1.5 as Δ (usual), and the specimen of less than 1.0% as x (no good).

(5) Temperature Dependence of Stiffness

About some of samples, the temperature dependence of the storage shear modulus was determined at strain of from 0.1 to 0.5% using a mechanical spectrometer (RMS 605M), made by Reometrix Co.

3. Content of Each Component Used (1) Crystalline Polypropylene Copolymer (PP)

A polypropylene (propylene-ethylene) block copolymer (MFR melt flow rate) at 230° C.: 1.2, component originated from ethylene: 26% by weight, made by Mitsubishi Peterochemical Co., Ltd.) was used.

(2) Polyethylene Terephthalate (PET)

Unipet (intrinsic viscosity in phenol/tetrachloroethane of 50/50 in weight ratio at 30° C: 1.0 dl/g, trade name, made by Nippon Unipet Co.) was used.

(3) Polyamide (PA)

Nylon 6,6, low viscosity product A3 (made by BASF AG) was used.

(4) Polyphenylene Ether (PPE)

Poly-2,6-dimethyl-1,4-phenylene ether made by Mitsubishi Petrochemical Co., Ltd. as 4 kinds of test samples each having following each different intrinsic viscosity in chloroform at 25° C. was used.

| Intrinsic viscosity | 0.28 dl/g (PPE 1) |
|---|---|
| " | 0.34 dl/g (PPE-2) |
| " | 0.44 dl/g (PPE-3) |
| " | 0.48 dl/g (PPE-4) |

(5) Styrene-Butadiene Block Copolymer (SBS)

A styrene-butadiene block copolymer having styrene content of 40% by weight and MFR at 190° C. of 2.6, made by Mitsubishi Petrochemical Co., Ltd. as test sample was used.

(6) Hydrogenated Styrene-Isoprene Block Copolymer (h-SI)

A copolymer, Kraton GX-1701 (trade name, made by Shell Chemical Co.) was used.

(7) Hydrogenated Styrene-Butadiene Block Copolymer (h-SBS)

The following copolymers, made by Shell Chemical Co., were used.

|  | Styrene Content | Solution Viscosity* |  |
|---|---|---|---|
| Kraton G 1726 | 30% | 200** | h-SBS-1 |
| Kraton G 1652 | 29% | 550 | h-SBS-2 |
| Kraton G 1650 | 28% | 1500 | h SBS-3 |
| Kraton G 1651 | 33% | 2000 | h-SBS-4 |

*Solution viscosity (CPS) at 25° C. in 20% by weight toluene solution.
**In 25% by weight toluene solution.

(8) Polystyrene (PS)

Polystyrene, HF 77 (trade name, made by Mitsubishi Monsanto Chemical Company) was used.

(9) Glycidyl Methacrylate-Styrene Copolymer (GMAPS)

A glycidyl methacrylate-styrene copolymer containing 95% styrene (GMA-PS) obtained by polymerizing styrene and glycidyl methacrylate at 80° C. for 6 hours using ethyl benzene as solvent and benzoyl peroxide as an initiator wa used.

(10) Maleic Anhydride (Manh)

Maleic anhydride as reagent grade was used as it was.

4. Preparation of Samples

Each of compoundings having the compositions shown in tables shown below was melt-kneaded using a twin screw extruder, PCM 30, made by Ikegai Tekko K.K. (the kneaded mixture is referred to as "Mix-1"). Further, regarding the combination of the crystalline polymer and amorphous polymer, a mixture of a crystalline polymer and an amorphous polymer was kneaded using a Labo Plast Mill, made by Toyo Seiki K.K. (Mix-2).

After kneading, each mixed composition was crushed to form granules and a sheet for property evaluation was formed from the granules using an M 40A-SJ type injection molding machine, made by Meiki Seisakusho K.K. (the sheet is referred to as "Inj"). Another sheet was formed from the granules by a compression molding machine, made by Toyo Seiki K.K. (the sheet is referred to as "Press").

EXAMPLES 1 TO 2 AND COMPARISON EXAMPLES 1 TO 3

Using each mixture of PA as a crystalline polymer, PPE having each different intrinsic viscosity as an amorphous polymer, SBS as a rubber-like polymer, and Manh as a compatibilizer in the compounding ratio (parts by weight, and hereinafter the same) shown in Table 1 below, each composition was obtained.

The properties of those compositions obtained were evaluated by the manners as described above and the results obtained are shown in Table 1. Microphotographs (3,000 magnification) of the cross sections of the compositions obtained in Examples 1 and 2 are shown in FIG. 3 and FIG. 4, respectively.

As is clear from the results shown in Table 1, it can be seen that the composition in Example 2, wherein SBS has a network structure in the PPE phase (as shown in FIG. 4) by controlling the melt viscosity ratio of PPE and SBS or the kneading condition of them, has greatly high impact strength as compared to the composition in Comparison Examples 1 and 2, wherein SBS shows a particle form structure in the PPE phase and also the compositions having imperfect network structures in Example 1 (FIG. 3) and Comparison Example 3. The composition in Example 1 is, however, superior to the compositions in the comparison examples to some extent in impact strength.

Also, on the composition in Example 2, the temperature dependence of storage shear modulus is shown in FIG. 1. From the result thereof, it can be seen that the composition retains high modulus up to high temperature and hence has excellent thermal characteristics.

EXAMPLES 3 AND 4, COMPARISON EXAMPLES 4 AND 5

By melt-compounding each mixture of PP as a crystalline copolymer, PPE+PS as an amorphous polymer, and h-SBS having each different intrinsic viscosity as a rubber-like polymer in each compounding ratio shown in Table 2 below, each composition was obtained.

The properties of the compositions thus obtained were evaluated by the manners as described above and the results obtained are shown in Table 2 below.

As is clear from the results, it can be seen that the compositions of the present invention in Examples 3 and 4, wherein h-SBS has a network structure in the amorphous polymer, show good balance in mechanical strengths.

On the other hand, the composition in Comparison Example 4, wherein h-SBS forms an extreme network structure, has low flexural modulus, particularly low flexural modulus at high temperature and hence does not satisfy the practical requirement for such a resin composition although the composition has excellent impact strength.

EXAMPLE 5 AND COMPARISON EXAMPLE 6

By following the same procedure as in Example 3 except that PPE having an intrinsic viscosity of 0.34 dl/g or 0.28 dl/g was used, the compositions shown in Table 2 below were obtained.

From the results shown in Table 2, it can be seen that the compositions in Example 5 and Comparison Example 6 form a partial continuous phase of the amorphous polymer dispersed in the PP continuous phase by properly selecting the melt viscosity ratio of the amorphous polymer and PP and show very high flexural modulus although the composition in Comparison Example 6 is far inferior to the composition in Example 5 in impact strength and resistance to chemicals.

In particular, the composition in Example 5 has very excellent balance in mechanical strengths.

EXAMPLES 6 AND 7

By following the same procedure as in Example 5 except that the compounding ratio of PPE and PP was changed, the compositions shown in Table 2 below were obtained.

From the results shown in Table 2, it can be seen that if the melt viscosity ratio of the amorphous polymer, PP, and h-SBS is appropriate, the amorphous polymer dispersed in the PP continuous phase forms a partial continuous phase even when the amount of the amorphous polymer is larger than the amount of PP, whereby the composition having excellent mechanical property and chemical resistance can be obtained.

EXAMPLE 8, COMPARISON EXAMPLES 7 TO 9

By melt-kneading each mixture of PES as a crystalline polymer, PPE as an amorphous polymer, h-SI as a rubber-like polymer, and GMA-PS as a compatibilizer in the compounding ratio shown in Table 3 below, each composition was obtained.

The properties of those compositions obtained were evaluated by the manners shown above and the results are shown in Table 3. Microphotographs of the cross sections of the compositions in Example 8 and Comparison Example 9 are shown in FIG. 5 and FIG. 6, respectively.

From the results, it can be seen that the composition in Example 8, wherein h-SI has a network structure in the PPE phase (cf. FIG. 5), has very excellent impact strength as compared to the compositions in Comparison Examples 7 and 8.

Furthermore, the temperature dependence of the storage shear modulus of the composition in Example 8 is shown in FIG. 2, which shows that the composition shows excellent rigidity even at high temperature.

TABLE 1

| | PPE | | PA | SBS | Mank | Kneading Condition | | Dispersed Form of PPE in PA | Dispersed Form of Rubber-like Polymer |
|---|---|---|---|---|---|---|---|---|---|
| | Kind | Amount | | | | Kneading | Molding | | |
| Comparison Example 1 | PPE-1 | 55 | 45 | 15 | 0.5 | Mix-1 | Inj | Particle | Particle |
| Comparison Example 2 | PPE-2 | " | " | " | " | " | " | " | " |
| Example 1 | PPE-3 | " | " | " | " | " | " | " | Partially continuous |
| Example 2 | PPE-4 | " | " | " | " | " | " | " | Network |
| Comparison Example 3 | PPE-3 | " | " | " | " | Mix-2 | Compression | " | Particle |

| | Proportion of SBS Particles of C ≦ 0.6 (%) | Izod Impact Strength (23° C.) (kg·cm/cm) | Falling Weight Impact Strength (23° C.) (kg·cm) | Flexural Modulus (23° C.) (kg/cm²) | Resistance to Chemicals |
|---|---|---|---|---|---|
| Comparison Example 1 | ≈0 | 5.5 | 20 | 20,700 | |
| Comparison Example 2 | ≈0 | 7.9 | 24 | 20,300 | |
| Example 1 | 34 | 17.8 | 37 | 20,100 | |
| Example 2 | 80 | 28.1 | 127 | 20,200 | |
| Comparison Example 3 | 5 | 8.4 | 23 | 20,200 | |

TABLE 2

| | PPE | | PS | PP | h-SBS | | Preparation Condition | | Dispersed Form of PPE in PP | Dispersed Form of Rubber-like Polymer |
|---|---|---|---|---|---|---|---|---|---|---|
| | Kind | Amount | | | Kind | Amount | Kneading | Molding | | |
| Comparison Example 4 | PPE-3 | 45 | 15 | 40 | h-SBS-1 | 15 | Mix-1 | Inj | Particle | Network |
| Example 3 | " | " | " | " | h-SBS-2 | " | " | " | " | " |
| Example 4 | " | " | " | " | h-SBS-3 | " | " | " | " | " |
| Comparison Example 5 | " | " | " | " | h-SBS-4 | " | " | " | " | Particle |
| Example 5 | PPE-2 | " | " | " | h-SBS-2 | " | " | " | Partially Continuous | Network |
| Comparison Example 6 | PPE-1 | " | " | " | " | " | " | " | Continuous | Particle |
| Example 6 | PPE-2 | 35 | " | 50 | " | " | " | " | Partially Continuous | Network |
| Example 7 | " | 25 | " | 60 | " | " | " | " | Partially Continuous | " |

TABLE 2-continued

| | Proportion of h-SBS Particles of C ≦ 0.6 (%) | Izod Impact Strength kg · cm/cm | | Falling Weight Impact Strength (kg · cm) | | Flexural Modulus (kg/cm²) | | Resistance to chemicals |
|---|---|---|---|---|---|---|---|---|
| | | 23° C. | −30° C. | 23° C. | −30° C. | 23° C. | 80° C. | |
| Comparison Example 4 | 93 | 39.4 | 10.8 | 180 | 52 | 7,400 | 4,000 | |
| Example 3 | 80 | 31.5 | 9.2 | 135 | 50 | 10,500 | 6,900 | |
| Example 4 | 62 | 26.7 | 8.7 | 160 | 39 | 11,500 | 7,600 | |
| Comparison Example 5 | ≃0 | 7.4 | 3.9 | 31 | 15 | 11,800 | 8,000 | |
| Example 5 | 49 | 23.1 | — | 112 | — | 14,200 | — | |
| Comparison Example 6 | ≃0 | 5.2 | — | 22 | — | 15,900 | — | Δ |
| Example 6 | 55 | 24.0 | — | 120 | — | 12,300 | — | |
| Example 7 | 60 | 24.8 | — | 121 | — | 10,900 | — | |

TABLE 3

| | PPE | | PET | h-SI | GMA-PS | Preparation Condition | | Dispersed Form of PPE in PES |
|---|---|---|---|---|---|---|---|---|
| | Kind | Amount | | | | Kneading | Molding | |
| Comparison Example 7 | PPE-2 | 40 | 50 | 10 | 10 | Mix-2 | Compression | Partially continuous |
| Comparison Example 8 | PPE-3 | " | " | " | " | " | Compression | Partially continuous |
| Example 8 | PPE-4 | " | " | " | " | " | Compression | Particle |
| Comparison Example 9 | " | " | " | " | " | Mix-1 | Compression | " |

| | Dispersed Form of Rubber-like Polymer | Proportion of h-SI Particles of C ≦ 0.6 (%) | Izod Impact Strength (23° C.) (kg · cm/cm) | Flexural Modulus (23° C.) (kg/cm²) | Resistance to Chemicals |
|---|---|---|---|---|---|
| Comparison Example 7 | Particle | 0 | 2.2 | 25,000 | |
| Comparison Example 8 | Partially continuous | 21 | 3.9 | 24,800 | |
| Example 8 | Network | 71 | 17.8 | 24,100 | |
| Comparison Example 9 | Particle | 10 | 7.4 | 25,000 | |

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition comprising components (1), (2) and (3) in which component (2) forms a continuous phase, component (1) forms a continuous phase intermingled with component (2) or forms a dispersed phase in component (2), and component (3) is dispersed in component (1), at least a part of component (3) having a continuous structure;

(i) said component (1) ranging from 10 to 55% by weight and being an amorphous polymer having a glass transition temperature of at least 90° C. and being selected from the group consisting of polyphenylene ether, polycarbonate, amorphous polyamide having a crystallinity less than 15%, polystyrene and acrylonitrile-butadiene-styrene resin;

(ii) component (2) ranging in an amount from 40 to 85% by weight and being a crystallized polymer which shows at least partial crystalline properties, has a melting point of at least 100° C. and is at least one material selected from the group consisting of polyolefins, crystalline polyamides having a crystallinity of at least 15%, and polyalkylene terephthalates; and (iii) component (3) ranging in an amount from 5 to 35 % by weight of a rubbery polymer having a storage shear modulus at room temperature of $5 \times 10^8$ dyne/cm² or less, all weight percents being based on the weight of the thermoplastic resin composition, wherein the dispersed state of component (3) is such that the number of the rubber-like dispersed particles having compactness C (obtained by the expression $C = 4\pi s/L^2$, wherein S is the area of the rubbery polymer phase and L is the circumferential length thereof) of 0.6 or less is in the range of from 30 to 90% to the number of whole rubbery polymer particles.

2. The thermoplastic resin composition as claimed in claim 1, wherein component is polyphenylene ether or polycarbonate.

3. The thermoplastic resin composition as claimed in claim 1, wherein component (2) is at least one member selected from the group consisting of polypropylene, crystalline polyamide, and polyethylene terephthalate.

4. The thermoplastic resin composition as claimed in claim 1, wherein component (1) is polyphenylene ether or polycarbonate, component (2) is polyolefin, and component (3) is an aromatic vinyl compound-conjugated diene copolymer.

5. The thermoplastic resin composition as claimed in claim 1, wherein the number of the rubbery dispersed particles having compactness C of 0.6 or lower is in the range of 40% to 90%.

6. The thermoplastic resin composition as claimed in claim 1, wherein component (1) is in a form intermingled with component (2).

7. The thermoplastic resin composition as claimed in claim 1, wherein the crystalline polymer of component (2) is partially crystalline to the extent of at least 15% wherein the crystallinity is determined by X-ray diffraction.

8. The thermoplastic resin composition as claimed in claim 1, wherein said rubbery polymer component (3) is a member selected from the group consisting of an aromatic vinyl compound-conjugated diene block copolymer, a random aromatic vinyl compound-conjugated diene copolymer, and an olefinic copolymer and copolymers.

9. The thermoplastic resin composition as claimed in claim 1, wherein said amorphous polymer component (1) as a member selected from the group consisting of polyphenylene ether, polycarbonate, polystyrene and acrylonitrile-butadiene-styrene resin has a crystallinity, as determined by X-ray diffraction, of less than 25%.

10. The thermoplastic resin composition as claimed in claim 1, wherein said amorphous polymer component (1) is a polymer obtained by the oxidative coupling polymerization of at least one phenol compound of the formula:

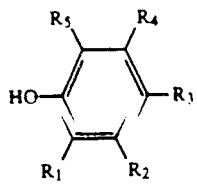

wherein $R_1$, $R_2$, $R_3$, $R_4$ and $R_5$ each independently is hydrogen, halogenated hydrocarbon, hydrocarbon or substituted hydrocarbon.

11. A thermoplastic resin composition comprising components (1), (2) and (3) in which component (2) forms a continuous phase, component (1) forms a continuous phase intermingled with component (2) or forms a dispersed phase in component (2), and component (3) is dispersed in component (1), at least a part of component (3) having a continuous structure; component (1) being from 5 to 65% by weight of an amorphous polyphenylene ether having a glass transition temperature of at least 90° C., component (2) being from 20 to 92% by weight of a crystalline polyamide exhibiting at least a partially crystalline property and having a melting point of at least 100° C., and component (3) being from 3 to 50% by weight of the styrene-butadiene-styrene block copolymer having a storage shear modulus at room temperature of $5 \times 10^8$ dyne/cm$^2$ or less, all weight percents being based on the weight of the thermoplastic resin composition.

* * * * *